Feb. 12, 1952  C. SCHULTZ ET AL  2,585,411
SURFACE CONTROL SYSTEM
Filed Aug. 8, 1946  3 Sheets-Sheet 1
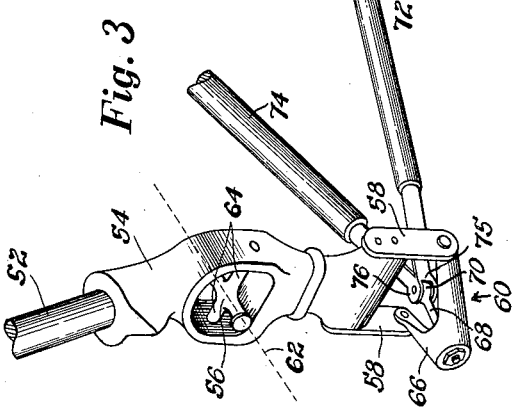
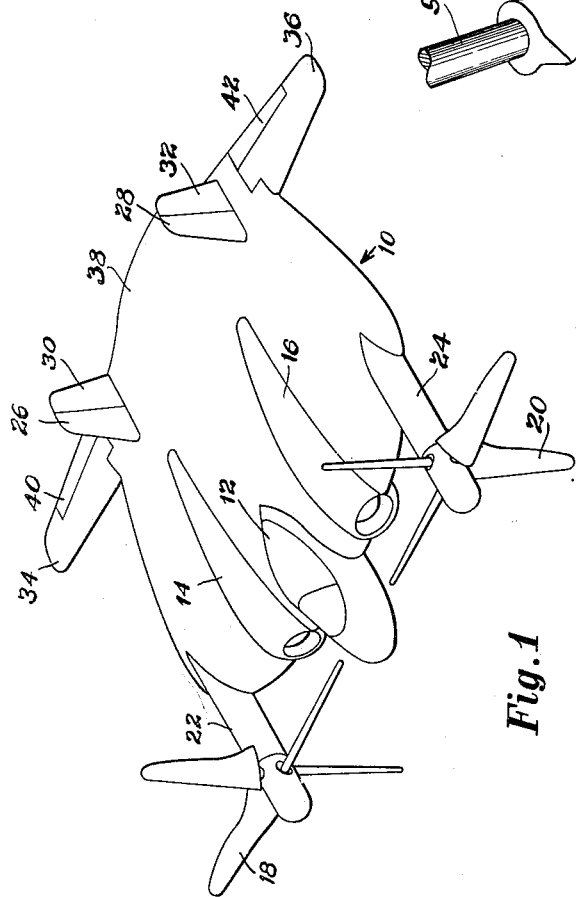
INVENTORS
Carl Schultz
Samuel Avena
BY
M. B. Tasker
ATTORNEY Feb. 12, 1952  C. SCHULTZ ET AL  2,585,411
SURFACE CONTROL SYSTEM Filed Aug. 8, 1946  3 Sheets-Sheet 2

INVENTORS
Carl Schultz
Samuel Avena
BY M. B. Tasker
ATTORNEY

INVENTOR.
Carl Schultz
BY Samuel Avena

ATTORNEY

Patented Feb. 12, 1952

2,585,411

UNITED STATES PATENT OFFICE 2,585,411

SURFACE CONTROL SYSTEM

Carl Schultz, Milford, and Samuel Avena, Stratford, Conn., assignors to United Aircraft Corporation, East Hartford, Conn., a corporation of Delaware Application August 8, 1946, Serial No. 689,082

9 Claims. (Cl. 244—82)

This invention relates to surface control systems for aircraft and particularly to surface control systems for low aspect ratio, all-wing aircraft.

It is an object of this invention to provide an improved surface control system for aircraft including two all-moving, or unit, tail surfaces which replace the conventional elevators and ailerons and to provide an improved operating mechanism for moving these surfaces either differentially, identically or in some comprise manner by a single pilot controlled member.

Another object of the invention is to provide a combined leading and spring tab mechanism for such a unit tail surface.

A further object of the invention is to provide complete control of unit tail surfaces on a low aspect ratio, all-wing airplane, both as ailerons and elevators, by a single control column.

A still further object of the invention is to provide automatically operative means for reducing high stick loads as an aid to the pilot in obtaining the desired deflection of the unit control surfaces in all flight conditions of the aircraft.

These and other objects and advantages of the invention will be evident from the following specific description of a preferred embodiment of the invention illustrated in the accompanying drawings.

In these drawings,

Fig. 1 is a perspective view of a low aspect ratio, all-wing airplane having the surface control system of this invention;

Fig. 3 is an enlarged perspective detail of the support for the control column and the operating connections to the column;

Figure 2:
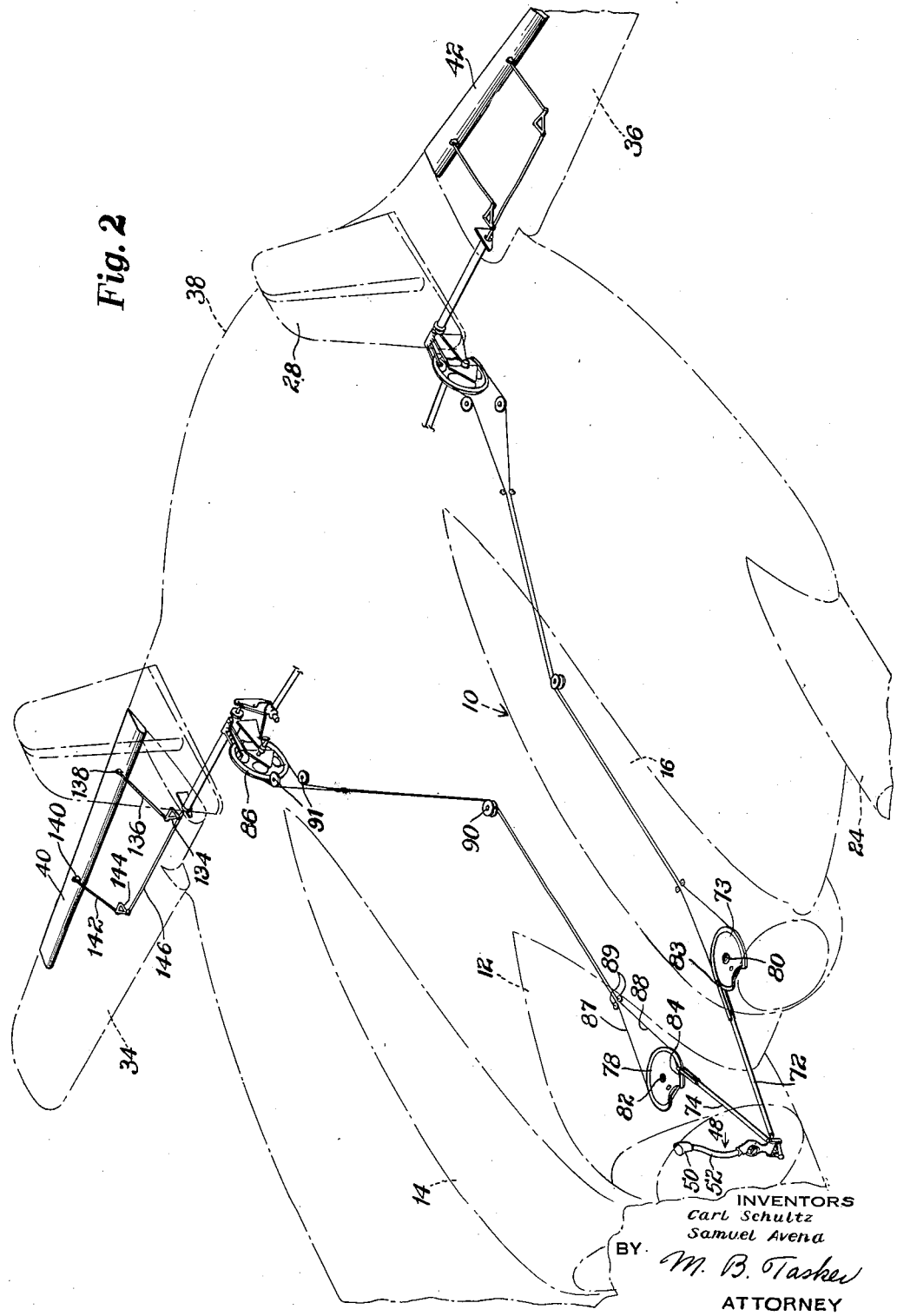
Fig. 2 is an enlarged view of the airplane of Fig. 1 showing the control system for the unit tail surfaces with parts broken away to facilitate illustration and with the airplane shown in phantom lines.

Referring to Fig. 1, the numeral 10 indicates generally the main wing portion of the airplane which contains a pilot compartment 12, nacelles 14 and 16 for the engines (not shown) for driving two oppositely rotating propellers 18 and 20 which are mounted in propeller nacelles 22 and 24 projecting forward of the leading edge of the wing near the lateral extremities thereof. The main wing 10 is provided with vertical fins 26 and 28 carrying the usual pivoted trailing rudders 30 and 32 and is also provided with outwardly projecting control surfaces 34 and 36 the trailing edges of which form extensions of the trailing edge 38 of the main wing 10. The control surfaces 34 and 36 are provided with trailing edge tabs 40 and 42, respectively, which extend from the wing 10 outboard a substantial distance along the length of surfaces 34 and 36 and comprise combined leading and spring tabs.

The pivoted control surfaces 34 and 36 and their pivoted trailing edge tabs 40 and 42 comprise all-moving, or unit, tail surfaces which are particularly advantageous in an all-wing, low aspect ratio aircraft. Whereas the unit tail surface when applied to the conventional airplane permits the use of a surface of less area than would be possible by the use of the ordinary elevator-stabilizer combination, the use of such unit tail surfaces in the all-wing low aspect ratio airplane shown herein is particularly advantageous because of the extremely large range of angles of incidence of the air in the region of these control surfaces.

Figure 5:
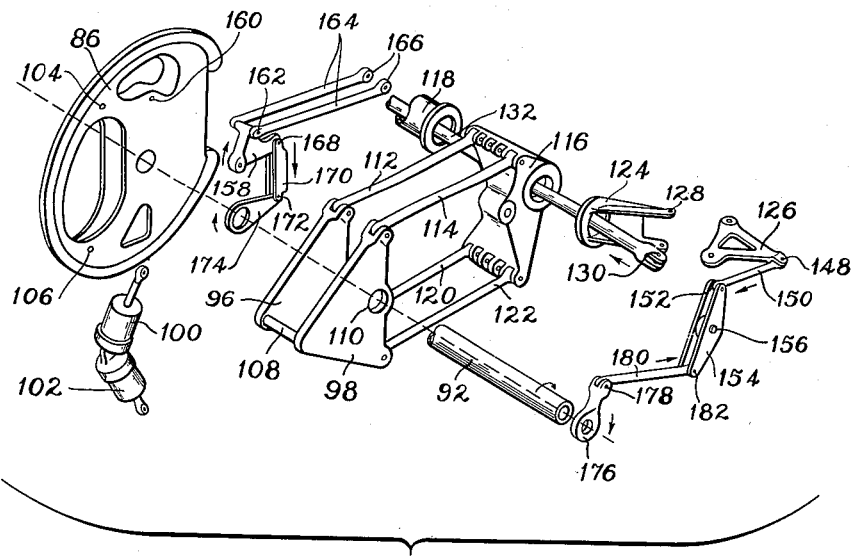
Fig. 5 is an exploded view of the movable elements of the control mechanism of Fig. 4.

In conjunction with the unit control surfaces 34 and 36 the trailing edge tabs 40 and 42 normally act as leading tabs or anti-boost tabs. A leading tab is defined to be a tab that normally moves in the same direction as the control surface but assumes a greater angular deflection relative to the main wing than the control surface. Thus, as the control surface is deflected towards its maximum travel in either direction, the leading tab will deflect at a greater rate in the same direction. Accordingly, as deflection increases the leading tab tends to exert a balancing force to counteract any overbalance tendency which might appear in the unit surface. The use of a leading or anti-boost tab is shown and described in Patent No. 2,416,958 dated March 4, 1947—column 8, lines 52–70 and Fig. 5.

The airplane illustrated operates through the angle of attack range from 0 to 35° in power-off flight and the range from 0 to 90° in power-on flight. The angle of the air in the region of the horizontal tail surfaces varies through a range of angles of the order of 40° relative to the longitudinal axis of the aircraft, slipstream effects preventing it from exceeding this range in power-on flight. In comparsion a conventional airplane operates through an angle of attack range of the order of 20° and because of downwash effects from the main airfoil, the angle of the air relative to the longitudinal axis of the aircraft in the region of the horizontal tail surfaces varies approximately half this amount or through a range of 10°.

With the conventional airplane it is hence possible to use a fixed stabilizer with a controllable trailing edge flap as an elevator. On the other hand in the case of the low aspect ratio, all-wing airplane illustrated the full angle of attack range of the airplane cannot be attained with a conventional stabilizer and a trailing edge elevator unless the stabilizer is made adjustable through a wide range of angles of the order of 30°, this condition resulting from the wide range of angles of the ambient air in the region of the tail surfaces. The use of a stabilizer adjustable through such a range makes it possible to trim the airplane through its possible speed range but the controllability of the aircraft is still uncertain because of the necessity of adjusting the stabilizer in order to effect moderate or large changes in trim speed and the necessity of adjusting it during performance of maneuvers.

By using the unit tail surface arranged to be rotatable through a wide range of angles of the order of 70° and by controlling the rotation directly by the usual elevator control linkage it is made possible to trim the airplane through its entire speed range, power-on or power-off, and perform the most violent maneuvers through the use of this control alone. Also it is desirable to use these same control surfaces to provide lateral control of the airplane.

To this end the unit tail surfaces 34 and 36 are connected by suitable operating connections with the pilot control column 48 located in the pilot compartment 12 so that these surfaces are moved identically by fore and aft movements of the control column to provide longitudinal control of the airplane, differentially by lateral movements of said column to provide lateral control of the airplane, or in a compromise of these two movements by oblique movements of the control column.

The control column comprises a hand grip 50, a stick 52, a socket assembly 54, a trunnion 56, a pair of depending fork arms 58 and a universal assembly 60. The trunnion 56 has its fore and aft pivotal axis 62 fixed at its extremities to fixed structure of the airplane (not shown) and has the socket assembly 54 pivotally mounted on its lateral trunnion arms 64, as shown most clearly in Fig. 3. With this arrangement it will be evident that the control column is mounted for universal movement about the intersection of the axis including arms 64 and the fore and aft axis 62.

The fork arms 58 which are rigid with the socket assembly 54 carry at their depending ends a U-shaped frame 66 which supports a generally horizontal rearwardly directed tongue 68 terminating in a ball 70 of the universal assembly 60. The ball 70 is located a sufficient distance below the intersection of the fore and aft axis 62 with the axis of the trunnion arms 64 to provide an adequate moment arm for moving the control linkage attached thereto in response to movements of the stick. The ball 70 is received in a suitable socket 75 at the forward end of a push-pull rod 72 connected at its aft end to a sector wheel 73 (Fig. 2) which through suitable cable connections controls the left hand unit surface 36. A generally similar push-pull rod 74 having a yoke 76 at its forward end suitably pinned to the socket 75 of rod 72 is pivotally connected at its aft end to a sector wheel 78 which controls the right hand unit surface 34 through suitable cable connections. It will be noted that the sector wheels 73 and 78 are equally laterally spaced from the control column and that the push-pull rods 72, 74 connected therewith diverge outwardly and aft from the ball 70 on the lower end of the control column. The sector wheels 73 and 78 are centrally pivoted at 80 and 82, respectively, and have the aft ends of the rods 72, 74 pivotally connected thereto at eccentric points 83, 84 on adjacent inboard portions of the peripheries thereof.

The unit control surfaces 36 and 34 and the mechanism by which they are operatively connected to sector wheels 73 and 78 are identical except for their left hand and right hand characteristics, and accordingly a description of the right hand surface 34 and its control mechanism will be sufficient for an understanding of the invention.

Figure 4:
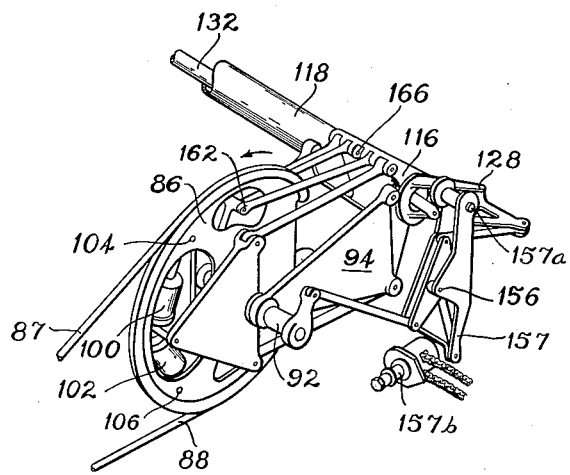
Fig. 4 is an enlarged perspective view showing the control mechanism for one of the unit surfaces.

The sector wheel 78 drives a hollow sector wheel 86 by means of cables 87 and 88 running over suitable pulleys 89, 90 and 91 and having their opposite ends connected to the ends of the sectors of wheels 78 and 86 in a well known manner to effect simultaneous and equal rotation of these wheels. It will be understood that to obtain the operation described the cables 87, 88 operatively connecting wheels 78 and 86 for surface 34 are crossed, while the similar cables between wheel 73 and wheel 86 for surface 36 are not crossed, as will appear from Fig. 2. The sector wheel 86 is rotatably mounted on a shaft 92 journalled in forwardly extending arms of a bracket 94 (Fig. 4) carried by fixed airplane structure adjacent the axis of pivotation of surface 34.

Considering the control surface 34 to be under no air load, rotation of sector 86 imparts rotation to the triangular arm assembly comprising parallel triangular plates 96 and 98 through spring struts 100 and 102. The spring struts are located within the hollow wheel 86 and have their remote ends pivotally connected to the wheel 86 at 104 and 106. Their adjacent ends are connected to a pin 108 which connects the apex of the triangular plates 96 and 98. The triangular plates 96 and 98 of the arm assembly, one of which is disposed on each side of wheel 86, are pivoted at 110 on shaft 92 at a point in the center of the base of each of these plates. The free corners of the plates 96 and 98 which are above the shaft 92 are pivotally connected by means of rods 112 and 114 with the upper arms of a horn 116 fixed to a torque tube 118 which is rotatable about the axis of pivotation of surface 34 and has this surface rigidly affixed thereto. The lower free corners of plates 96 and 98 are similarly connected to the lower arms of horn 116 by rods 120 and 122. It will thus be evident that movement of the cable sector wheel 86 results in like movement of the horn 116 when the surface 34 has no air load thereon, in which case the spring struts 100 and 102 transmit the movements of wheel 86 as if these struts were rigid links.

The combination leading and spring tab 40, when the surface 34 is under no aerodynamic load, acts purely as a leading tab with no spring tab motion. In such a condition motion of the cable sector 86 as imparted to horn 116, as above described, imparts rotational movement to a bell crank supporting member 124 which is coaxially disposed with respect to the horn and is fixed thereto so as to rotate in unison therewith. A bell crank 126 has one corner pivoted to said support 124 at 128 and has another corner thereof pivotally connected at 130 to a control rod 132 which extends axially through the torque tube 118 and is pivotally connected at its outboard end to a bell crank 134 (Fig. 2) which has its other free arm connected by a link 136 to one of the horns 138 of tab 40. Another horn 140 is connected by a parallel link 142 to a bell crank 144 which is operated by an extension 146 of rod 132. The third corner of bell crank 126 is pivotally attached at 148 to one end of rod 150, the other end of which is pivotally attached at 152 to a lever 154 which is pivoted at 156 to a lever 157 (Fig. 4) the upper end of which is pivoted to fixed structure of the airplane at 157a and the lower end of which is adjustably fixed by trim tab adjusting mechanism 157b. Under conditions of no load and no trim the point 152 may be considered a fixed point.

Mechanism is also provided whereby under high aerodynamic loading the tab 40 is deflected as a spring servo tab to assist the pilot in moving the control surface in the desired direction. As previously explained, if the surface 34, due to aerodynamic loading, resists the motion of the stick, sector wheel 86 will move ahead of horn 116 during which movement one of the spring struts will be compressed. This movement of sector wheel 86 relative to the horn 116 is utilized to deflect the tab 40 and thus relieve the pressure on the pilot's stick. To this end a bell crank 158 is pivoted at 160 within the hollow cable wheel 86 and has one of its arms pivoted at 162 to the forward ends of two parallel rods 164, the aft ends of which are pivoted at 166 to the upper arm of horn 116, these rods lying between and generally parallel with the rods 112, 114. The other arm of bell crank 158 is pivoted at 168 to the upper end of a link 170 disposed within the hollow wheel 86, the lower end of which is pivoted at 172 to the extremity of a crank arm 174 which is pinned to shaft 92 within wheel 86. A crank arm 176 is pinned to shaft 92 at its other extremity and has its free end pivoted at 178 to a rod 180 which is pivoted at its aft end to the lower extremity of arm 154 at 182.

In the operation of the mechanism above described it will be evident that fore and aft movements of the control column will result in equal and opposite rotation of the two cable sector wheels 73 and 78 resulting in identical movements of the right hand and left hand surfaces 34 and 36 since the rods 72 and 74 are symmetrical with the control column and have their forward ends pivoted to the ball 70 at the lower end of this column and have their aft ends pivoted to sector wheels 73 and 78 on opposite sides of the respective pivots 80, 82 thereof. Lateral movements of the control column, however, will result in rotation of sector wheels 73 and 78 in the same direction and a differential movement of the surfaces 34 and 40. For example, movement of the control stick 52 to the right of the pilot about the fore and aft axis 62, as viewed in Fig. 3, will cause clockwise rotation of both the sector wheels 73 and 78 (Fig. 2), resulting in an upward movement of control surface 34 and a downward movement of control surface 36, whereas movement of the control stick in the opposite direction about axis 62 from its neutral position will result in a downward movement of surface 34 and an upward movement of surface 36. Oblique movements of the stick, i. e. movements about the fore and aft axis 62 and the lateral axis of trunnion arms 64 simultaneously, will result in a compromise of the above described identical and differential movements of these surfaces.

When there is no aerodynamic loading on the surface 34 movements of the sector wheel 86 are transmitted directly to the horn 116 to move the surface 34 proportionately to the movement imparted to the sector wheel by the stick. The tab 40 also moves through a predetermined angular movement as a result of the angular movement of the surface 34, this movement of tab 40 under conditions of no aerodynamic loading of the surface being a function of the geometry of the tab operating linkage. It will be evident that rotation of horn 116, for example, in a counterclockwise direction (Fig. 4) to move surface 34 upwardly also results in a similar bodily rotation of tab operating rod 132 and bell crank support 124 and that the bell crank 126 carried by the latter is rotated bodily therewith and in the same direction as the surface 34. The fixed point 152 is, however, spaced from the axis of rotation of these parts and as a result this bodily rotation of bell crank 126 about this axis causes the bell crank 126 to rock in a counterclockwise direction (Fig. 4) about its pivotal support 128 and impart an inboard movement to rod 132 causing tab 40 to move upward relative to surface 34.

It will be evident that if due to aerodynamic loading the surface 34 resists motion of the stick, the horn 116 will not rotate immediately although motion is imparted to sector wheel 86 about its pivotal shaft 92. During this initial movement of the cable wheel 86 and while the horn 116 remains stationary, or at least does not move a proportionate amount, the point 152 which has up to now been considered a fixed point will be moved in such manner as to result in deflecting the tab to assist the pilot's movement of the stick. Thus referring to Figs. 4 and 5, if the sector wheel 86 is moved in a counterclockwise direction as indicated by the arrow in Fig. 4 and the aerodynamic loading on the surface 34 is such as to resist this movement the wheel 86 will move ahead of the horn 116. During this movement the pivot 128 of bell crank 126 and also the pivot 162 of bell crank 158 will be fixed points in the system and the movement of pivot 160 carried by wheel 86 will result in a clockwise movement of bell crank 158 about point 162. This movement, through link 170 and arm 174, will cause shaft 92 and its fixed arm 176 to rotate in a clockwise direction and link 180 to rotate arm 154 about its pivot 156 and rotate the bell crank 126 clockwise about its pivot 128. This movement will cause the rod 132 to move outboard, resulting in a downward deflection of the tab 40 which will assist the pilot in moving the surface 34 in the upward direction.

Thus tab 40 acts as a leading tab to enable the pilot to get the feel of surface deflection when there is no aerodynamic loading on the main control surface, but acts as a servo-tab under conditions of aerodynamic loading of the surface when it has a tendency to move toward its neutral position relative to the surface after movement of the control surface has been initiated. It will be understood that this same spring action of the tab 40 will occur whenever, due to aerodynamic loading, any lost motion occurs between the wheel 86 and the horn 116, although for purposes of description it was assumed that the aerodynamic loading was such as to maintain the horn 116 stationary during the initial movement of the wheel 86.

It will be evident that as a result of this invention a control system has been provided in which both longitudinal and lateral control of the airplane is obtained by the actuation of a single pilot operated control member. It will also be evident that by this invention provision has been made for automatic reduction of high stick loads as an aid to the pilot in obtaining the desired deflection of his control surfaces in all flight conditions of the aircraft.

While only one embodiment of the invention has been shown and described herein, it will be understood that numerous changes in the construction and operation of the parts may be made without departing from the scope of the invention as defined by the appended claims.

What it is desired to secure by Letters Patent is:

1. In an airplane, a main wing, two control surfaces mounted for pivotal movement on opposite sides of said main wing, a leading tab pivotally mounted on each control surface, a control member for operating said surfaces and said tabs, means for operatively connecting said control member with said surfaces and tabs for normally deflecting the same simultaneously and in the same direction, said surfaces being deflected relative to the main wing and said tabs being deflected relative to their respective control surfaces, resilient spring struts in said operative connections between said member and said surfaces for permitting a limited movement of said member relative to said surfaces under conditions of high air loads on the latter, and connective linkage between said spring struts and said tabs associated with said operative connections and moved in response to such relative movement of the control member for moving said tabs contra to their leading tendency.

2. In an airplane, a main wing, a control surface pivotally mounted on said wing, a leading tab pivotally mounted on said control surface, a pilot operated member for controlling said control surface and tab, means operatively connecting said member with said control surface and tab whereby said tab is normally movable in the same direction as said surface and has a greater rate of movement than said surface, means for obtaining automatic reduction of high stick loads as an aid to the pilot in obtaining the desired deflection of said control surface under high aerodynamic loads including a lost motion connection between said member and said surface, resilient spring struts normally maintaining said lost motion ineffective, and linkage between said spring struts and said tabs associated with said operative connecting means and moved in response to relative movement of said member to said surface due to said lost motion for reversely moving said tab.

3. In an airplane, a fixed main surface, a control surface carried by said main surface and movable relatively thereto, a leading tab carried by said control surface and movable relative thereto, a pilot operated member, operating connections between said member and said control surface and tab for normally moving said control surface and for simultaneously moving said tab relative to said surface and in the same direction in response to a corresponding movement of said member, resilient spring struts in said connections for permitting a limited movement of said member relative to said control surface, and separate connective linkage between said resilient struts and said tab associated with said operating connections and operated as a result of such relative movement of said member for moving said tab prior to and in the opposite direction to the movement of said surface.

4. In an airplane, a fixed main surface, a control surface carried by and movable with respect to said main surface, a leading tab carried by and movable with respect to said control surface, a pilot operated member, operating connections between said member and said control surface and tab for normally moving said control surface and for simultaneously moving said tab relative to said surface and in the same direction in response to a given movement of said member, means including a spring-loaded strut in said operating connections between said member and said control surface responsive to aerodynamic loading of said control surface for permitting a limited movement of said member relative to said control surface, and linkage interposed in said operating connections between said spring strut and said tab and operated in response to such relative movement whereby said tab is moved prior to and in the opposite direction to the movement of said surface.

5. In an airplane, a main wing, a control surface pivotally mounted on said wing, an adjustable trim tab hinged on said surface, a pilot's control stick having an operative connection to said control surface, connective means between said tab and said operative connection and responsive to movements of said surface about its pivot by said stick for normally moving said tab about its hinge in the same direction and ahead of said control surface to produce a leading effect, means including a resilient spring strut in said operative connection for rendering said connective means inoperative in response to high aerodynamic loading of said surface, and linkage connection between said spring strut and said tab associated with said operative connection and operative in response to the disabling of said connective means for reversing said tab movement about its hinge in relation to said control surface to produce a servo effect.

6. In an airplane, a main lifting surface, two control surfaces mounted on opposite sides of the fore and aft center-line of said main surface, a control member having two different movements, operative connections between said control member and said control surfaces for moving said surfaces in the same direction in response to one of said movements of said control member and in opposite directions in response to the other of said movements, said operative connections permitting said surfaces to freely respond simultaneously to either movement of said control member, a leading tab pivotally mounted on each control surface, mechanism associated with said operative connections and operatively connected to said leading tabs for normal deflecting the same in the same direction simultaneously with said control surfaces relative thereto upon movement of said control member, resilient struts in said operative connections for disabling said mechanism under conditions of high aerodynamic loads on said surfaces, and linkage connections between said resilient struts and said tabs associated with said operative connections and moved in response to the disabling of said mechanism for enabling said tabs to act as servo tabs for said control surfaces by movement contra to their leading tendency when the control surfaces are moved identically or differentially.

7. In an all wing airplane, two control surfaces mounted on opposite sides of the fore and aft centerline of said main wing, a pilot operated control member operatively connected to said surfaces whereby fore and aft components of the control member movement effect identical movements of said surfaces and lateral components of said member movement effect opposite movement of said surfaces, leading tabs connected to and normally movable in the same direction as said surfaces in response to movements of said member and having a greater rate of movement than said surfaces, operative connections between said surfaces and tabs and said member including a lost motion connection between said member and each of said surfaces, and linkage between said lost motion connection and said tabs and associated with said operative connections responsive to said lost motion under conditions of high air loads on said surfaces for reversely moving said tabs in relation to each of said surfaces.

8. In an airplane control surface mechanism, a control surface mounted on an integral rotatable torque tube, a tab pivotally mounted on said surface, a control stick operated sector wheel having a lost motion connection with a horn on said torque tube and having a link connection with said tab, said link connection including a push-pull rod coaxially disposed within said torque tube, said lost motion connection comprising resilient means normally permitting simultaneous movement of said control surface and tab in the same direction upon displacement of said sector wheel and reversal of said tab movement in relation to said surface under a predetermined aerodynamic loading on said combined surface and tab.

9. An airplane control surface mechanism according to claim 8 wherein the tab connections include a bell crank connection to the control surface torque tube horn for imparting greater movement to said tab than to said surface when the control surface and tab move in the same direction.

CARL SCHULTZ.
SAMUEL AVENA.

REFERENCES CITED

The following references are of record in the file of this patent:

UNITED STATES PATENTS

| Number | Name | Date |
|---|---|---|
| 2,277,378 | Wells | Mar. 24, 1942 |
| 2,325,548 | Roos et al. | July 27, 1943 |
| 2,370,844 | Davis | Mar. 6, 1945 |
| 2,416,958 | Sears | Mar. 4, 1947 |
| 2,467,795 | White | Apr. 19, 1949 |

FOREIGN PATENTS

| Number | Country | Date |
|---|---|---|
| 557,259 | Great Britain | Nov. 12, 1943 |
| 414,476 | Germany | May 29, 1925 |